May 8, 1956
J. A. SHEPPARD
2,744,582
ASPARAGUS HARVESTER
Filed July 13, 1953
2 Sheets-Sheet 1
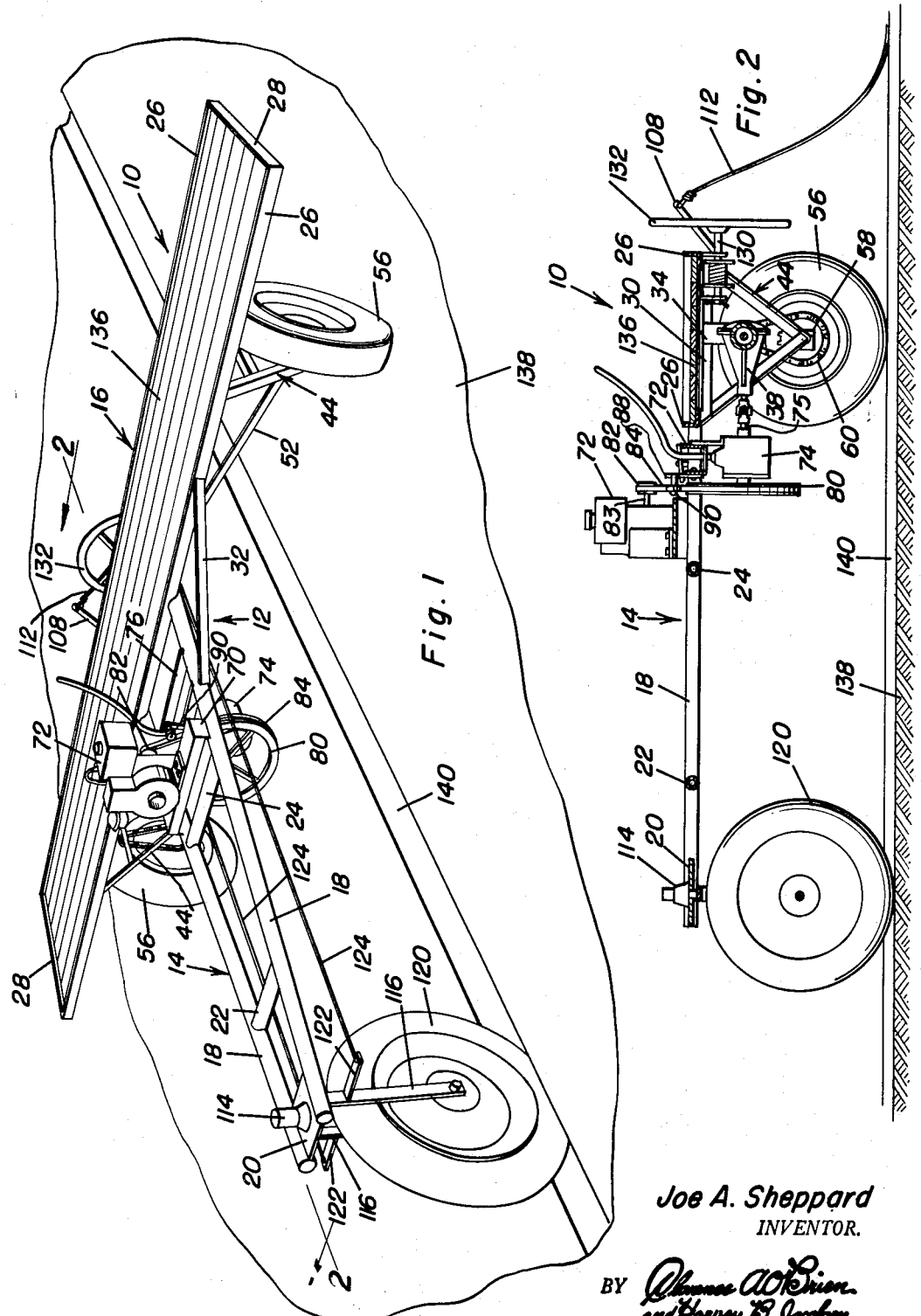
Joe A. Sheppard
INVENTOR.
BY
*Attorneys*

May 8, 1956
J. A. SHEPPARD
2,744,582
ASPARAGUS HARVESTER
Filed July 13, 1953
2 Sheets-Sheet 2
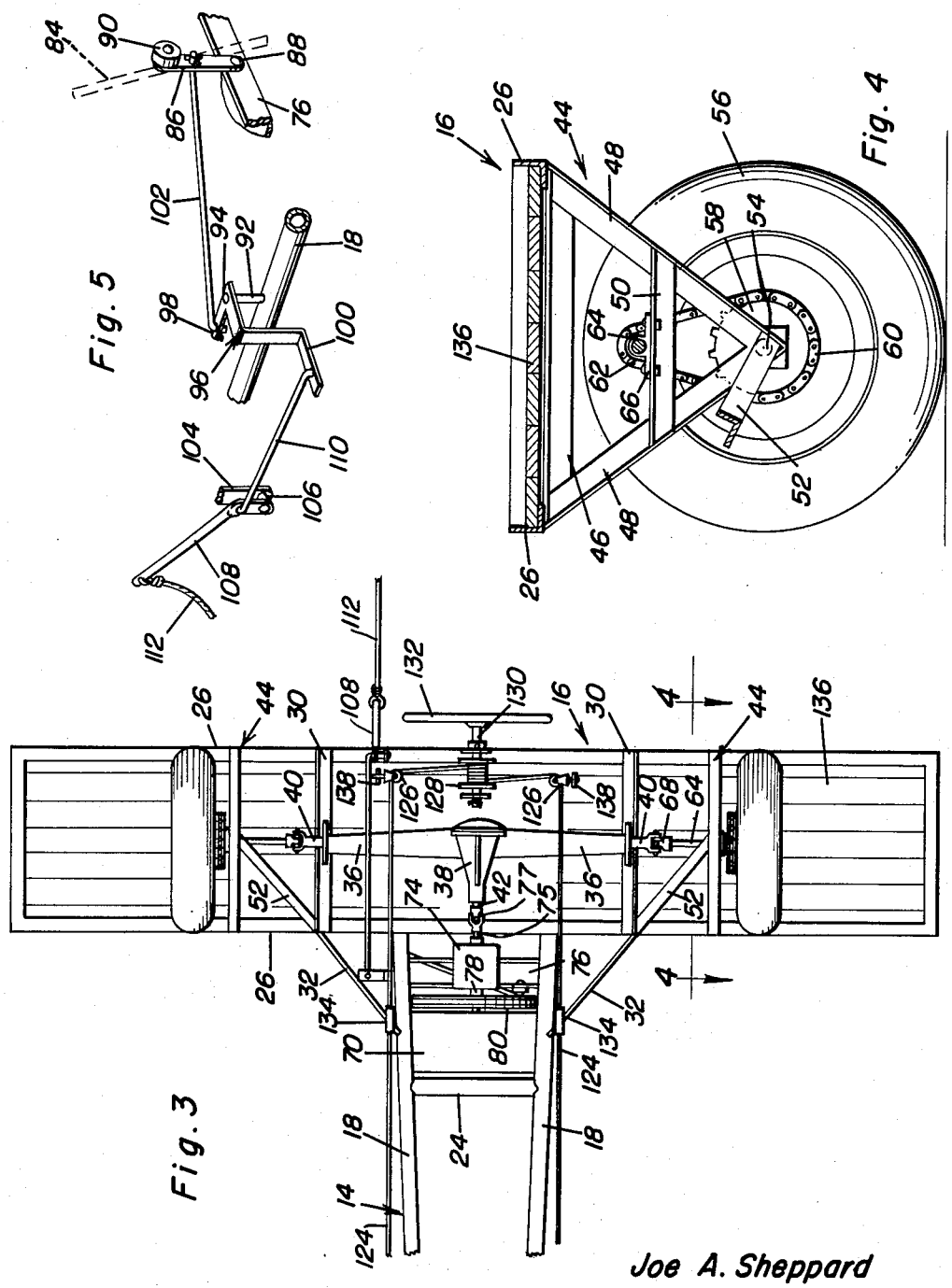
Joe A. Sheppard
INVENTOR.
BY
Attorneys

United States Patent Office 2,744,582
Patented May 8, 1956

2,744,582

ASPARAGUS HARVESTER

Joe A. Sheppard, Outlook, Wash.

Application July 13, 1953, Serial No. 367,709

1 Claim. (Cl. 180—19)

This invention relates in general to improvements in harvesters, and more specifically to an harvester for asparagus.

The primary object of this invention is to provide an improved asparagus harvester which is designed whereby the same may be controlled in its movement across an asparagus field by the positioning of a front wheel thereof in a previously formed rut or ditch and which may be selectively steered and controlled from the rear thereof.

Another object of this invention is to provide an improved asparagus harvester which includes a wheeled frame having a steering wheel at the front end thereof, controlled means for the steering wheel carried at the rear of the wheeled frame whereby the asparagus harvester may be remotely controlled.

Another object of this invention is to provide an improved asparagus harvester which includes a power unit having clutch means for connecting the same to driving wheels, the clutch means being controllable by control means disposed rearwardly and remotely of the harvester.

A further object of this invention is to provide an improved asparagus harvester which will move under its own power without control by an operator along a designated path through an asparagus field and which needs to be controlled only at turns at the end of rows of such an asparagus field.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front perspective view of the asparagus harvester which is the subject of this invention and shows the general outline of the same;

Figure 2 is a longitudinal sectional view taken substantially upon the plane indicated by the section line 2—2, of Figure 1 and shows the general control means for both driving and steering the asparagus harvester of Figure 1;

Figure 3 is a fragmentary bottom plane view of the asparagus harvester of Figure 1 and shows other details of the control means for the harvester;

Figure 4 is an enlarged fragmentary sectional view taken substantially upon the plane indicated by the section line 4—4 of Figure 3 and shows the drive means for an individual driving wheel of the harvester; and Figure 5 is a fragmentary perspective view of the linkage for clutch means of the harvester.

Referring now to the drawings indetail, it will be seen that they illustrate the asparagus harvester which is the subject of this invention, the asparagus harvester being referred to in general by the reference numeral 10. The asparagus harvester 10 includes a frame which is referred to in general by the reference numeral 12. The frame 12 includes a longitudinally extending portion which is referred to in general by the reference numeral 14 and a transversely extending portion which is referred to in general by the reference numeral 16, the frame being T-shaped in plan.

The longitudinal portion 14 includes a pair of rearwardly diverging frame rails 18 which are connected together at their forward ends by a transverse plate 20. The frame rails 18 are also connected together intermediate their ends by intermediate frame members 22 and 24.

The transverse portion 16 of the frame 12 is generally rectangular in outline and includes a pair of spaced parallel transverse frame members 26 which are connected together at their extreme ends by longitudinal frame members 28. The transverse frame members 26 are further connected together intermediate their ends by longitudinal frame members 30.

As is best illustrated in Figures 1 and 3, the frame rails 18 of the longitudinal portion 14 abut and terminate at the forwardmost of the transverse frame members 26. The longitudinal portion 14 is spaced relative to the transverse portion 16 by diagonal braces 32 which extend between rear portions of the frame rails 18 and the forwardmost transverse frame member 26 at its intersection with the longitudinal frame members 30.

Referring now to Figures 2 and 3, in particular, it will be seen that depending from the longitudinal frame members 30 are hangers 34. The hangers 34 have extending therebetween and connected thereto ends of axle housings 36. The axle housings 36 are parts of a rear end of a vehicle and are carried by a differential housing 38. Extending through the ends of the axle housings 36 are axles 40. Extending forwardly from the end of the differential housing 38 is a pinion shaft 42.

Carried by the transverse portion 16, outwardly of the longitudinal members 30 are generally triangular wheel supports which are referred to in general by the reference numeral 44. Each of the wheel supports 44, includes a longitudinal frame member 46 which is secured to the undersides of the transverse frame members 26. Depending from the ends of the longitudinal frame member 46, is a pair of downwardly converging frame members 48 which are connected together at their lower ends. The frame members 48 are connected together intermediate their ends by a horizontally disposed, longitudinally extending frame member 50. The lower ends of the wheel supports 44 are braced by forwardly and inwardly extending diagonal braces 52 whose positions are best illustrated in Figure 3.

Carried by each of the wheel supports 14, at the lower end thereof, is an outwardly extending stub axle 54. The individual stub axles 54 have rotatably mounted thereon driving wheels 56 for the asparagus harvester 10. Each of the driving wheels 56 have connected thereto a large sprocket 58 for driving the same. The sprocket 58 is connected by a drive chain 60 to a driving sprocket 62 which is mounted on a shaft 64. The shaft 64 has an end portion thereof rotatably journaled in a pillow block 66 carried by the frame member 50 associated therewith. As is best illustrated in Figure 3, each of the shafts 64 has the opposite end thereof connected to its associated axle 40 by a universal joint 68.

Disposed immediately rearwardly of the transverse frame member 24 is a transversely extending motor mounting plate 70. Mounted on the motor mounting plate 70, is a small internal combustion engine 72. The internal combustion engine 72 has associated therewith a transmission 74 having a rearwardly extending output shaft 75 connected to pinion shaft 42 by universal 77 which is carried by a transversely extending transmission mounting plate 76. The transmission 74 is provided with a forwardly extending input shaft 78 on which is mounted a relatively large pulley 80. The pulley 80 is disposed in vertical alignment with a drive pulley 82 on the horizontal drive shaft 83 of the internal combustion engine 72 and connected thereto by a drive belt 84.

Referring now to Figure 5, in particular, it will be seen that carried by the transmission mounting plates 76 is an arm 86 which projects upwardly therefrom and is pivotally connected thereto by a pivot pin 88. The arm 86 has rotatably mounted thereon an idler wheel 90 which is selectively engageable with the drive belt 84 to tension the same. It will be understood that the idler pulley 90 is in the form of a clutch inasmuch as the internal combustion engine 72 is drivingly connected to the transmission 74 only when the belt 84 is tensioned due to movement of the idler pulley 90 to the left, as is illustrated in Figure 5.

Carried by one of the frame rails 18 in transverse alignment with the arm 86 is an upstanding post 92. Pivotally connected to the post 92 by a pivot pin 94 is a bell crank which is referred to in general by the reference numeral 96. It will be noted that the bell crank 96 is both transversely and vertically offset and includes terminal legs 98 and 100. Terminal leg 98 is connected to the arm 86 by a rod 102.

Referring now to Figures 3 and 5, in particular, it will be seen that depending from the rearmost transverse frame member 26 generally in alignment with the leg 100, is a support 104. The support 104 has connected thereto by a transversely extending pivot pin 106, an actuating lever 108. The actuating lever 108 has connected thereto intermediate its ends, a rod 110, whose opposite end is connected to the leg 100 for pivoting the same. Carried by the opposite end of the lever arm 108 is a trailing flexible control member 112, the control member 112 being intended to trail rearwardly of the asparagus harvester 10.

Referring now to Figures 1 and 2, in particular, it will be seen that there is pivotally carried by the plate 20, a fork 114. The fork 114 includes a pair of spaced depending legs 116 which have rotatably mounted therebetween a steering wheel 120.

Carried by the legs 116 and projecting outwardly therefrom are transversely extending members 122. The members 122 have connected thereto forward ends of flexible control cables 124. Referring now to Figure 3, in particular, it will be seen that the flexible control cables 124 are entrailed over pulleys 126 which are mounted in a manner to be explained in more detail hereinafter. The control cables 124 are then reeled over a drum 128 carried by a rotatable shaft 130 suitably mounted in underlying relation with respect to the transverse portion 16. The shaft 130 has disposed at its rear end a steering wheel or control wheel 132, the control wheel 132 being disposed rearwardly of the frame 12. The flexible control members 124, if desired, may be integral and are supported intermediate their ends by sleeves 134 carried by the diagonal braces 132.

Referring now to Figure 4, in particular, it will be seen that the transverse frame members 26 are L-shaped in cross-section and mounted therebetween is a platform 136. The platform 136 is intended to have placed thereon asparagus plants which have been picked from an asparagus field.

Referring once again to Figure 3, in particular, it will be seen that carried by the underside of the platform 136, in spaced relation, are depending hangers 138. The hangers 138 form as supports for the pulleys 126.

Referring now to Figure 1, in particular, it will be seen that the asparagus harvester 10 is illustrated in an asparagus field 138, the asparagus plants not being shown. Extending across the asparagus field 138 is a shallow ditch or rut 140. It will be understood that this rut 140 is in parallel relation with respect to asparagus plants and disposed between rows thereof. The steering wheel or control wheel 120 is disposed within the rut 140 and is guided thereby. In operation, the asparagus harvester 10 is properly positioned at one end of the field with the steering wheel 120 disposed in the rut 140. The internal combustion engine 72 is drivingly connected to the transmission 74 and the asparagus harvester 10 is permitted to move between rows of asparagus plants without being controlled, the asparagus harvester being steered by the steering wheel 120, being disposed within the rut 140. It will be understood that the asparagus harvester 10 travels at a rate of speed equal to that normally maintained by a person harvesting asparagus. Should the asparagus harvester 10 proceed much in advance of the harvesting crew, the forward motion of an asparagus harvester 10 may be stopped by pulling on the trailing control member 112. In this manner, the internal combustion engine 72 may be disengaged from the transmission 74 through the various linkage to which the arm 86 is connected.

It will be understood that the control wheel 132 need only be utilized at the end of rows. The control wheel 132 is actuated to turn the steering wheel 120 whereby the asparagus harvester 10 makes a U-turn and the steering wheel 120 positioned in a next adjacent rod 140.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A machine for harvesting asparagus comprising a T-shaped frame having a transverse rear portion and a downwardly extending centrally disposed longitudinal portion, rear drive wheels mounted on said transverse portion of the frame, a steering wheel mounted on said longitudinal portion of the frame adjacent the front end thereof for pivotal movement about substantially a vertical axis for guiding the machine, a power unit mounted upon the longitudinal portion of the frame forwardly of the transverse portion thereof, said power unit having a rearwardly extending horizontal drive shaft with a belt pulley mounted thereon, a power transmission device supported on the longitudinal portion of the frame forwardly of the transverse portion thereof and below the plane of the power unit, said transmission device having a forwardly extending horizontal input shaft with a belt pulley thereon in alignment with the belt pulley on the power unit drive shaft, an endless belt encircling said belt pulleys, said transmission having a rearwardly extending output shaft, and means interconnecting the output shaft of the transmission and the drive wheels for rotating said drive wheels, an arm pivotally supported on said frame adjacent the transmission, an idler pulley mounted on the free end of said arm for engagement with and tensioning of the endless belt, a bellcrank having the apex pivotally supported from said frame transversely of the arm, a rod interconnecting one leg of said bellcrank and said arm, an operating lever pivotally supported on the frame adjacent the rear of the transverse portion thereof for swinging movement in a longitudinal plane, a rod interconnecting the lever and the other leg of the bellcrank, said lever normally extending in an upwardly and rearwardly inclined position with the free end disposed rearwardly of the frame, a flexible trailing line attached to the free end of the lever and being sufficiently long to be disposed on the ground surface whereby the line may be stepped upon when the machine is moving forwardly for moving the idler pulley away from the endless belt for releasing the tension thereon for permitting free rotation of the pulley on the drive shaft and stopping the machine, an elongated continuous load supporting platform mounted on the transverse portion of the frame and extending outwardly beyond the drive wheels for bridging a plurality of rows of asparagus, and control means for said steering wheel including a control wheel rotatably supported adjacent to and beneath the rear edge of the transverse portion of the frame, said control wheel being disposed substantially in a vertical plane and spaced rearwardly of the transverse portion of the frame and platform, and means interconnecting the control wheel and steering wheel for controlling the direction of movement of the machine.

References Cited in the file of this patent

UNITED STATES PATENTS

| | | |
|---|---|---|
| 791,571 | Nudd | June 6, 1905 |
| 1,076,761 | Griggs | Oct. 28, 1913 |
| 1,258,362 | Rupprecht | Mar. 5, 1918 |
| 1,390,936 | Stilgenbauer | Sept. 13, 1921 |
| 1,407,606 | Virgens | Feb. 21, 1922 |
| 1,680,780 | Gilson | Aug. 14, 1928 |
| 2,178,505 | Warneke | Oct. 31, 1939 |
| 2,184,198 | Seeber | Dec. 19, 1939 |
| 2,264,924 | Wolrab | Dec. 2, 1941 |
| 2,453,999 | Melling | Nov. 16, 1948 |
| 2,500,168 | Du Pont | Mar. 14, 1950 |
| 2,511,940 | Platt et al. | June 20, 1950 |
| 2,520,835 | England | Aug. 29, 1950 |
| 2,523,832 | Kunkel | Sept. 26, 1950 |
| 2,590,965 | Huston | Apr. 1, 1952 |